Sept. 28, 1965  A. E. ANDERSON  3,208,213
SUPERCHARGER FOR AN INTERNAL COMBUSTION ENGINE
Filed May 18, 1964
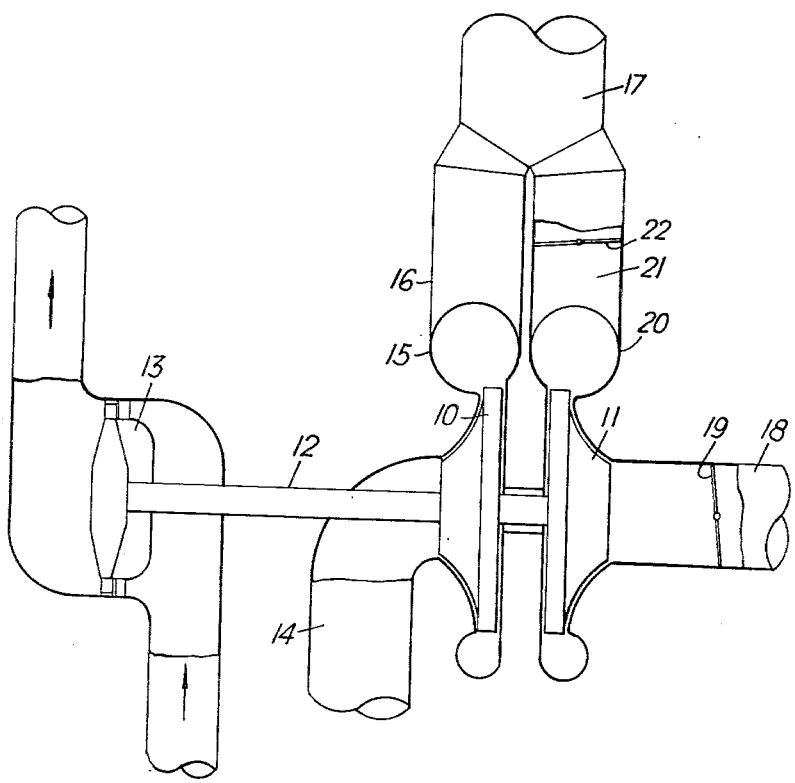
Inventor
ALEXANDER EDWARD ANDERSON
By *Rupert J. Brady*
Attorney

United States Patent Office 3,208,213
Patented Sept. 28, 1965

3,208,213
SUPERCHARGER FOR AN INTERNAL
COMBUSTION ENGINE
Alexander E. Anderson, Leeds, England, assignor to The
British Ship Research Association, London, England
Filed May 18, 1964, Ser. No. 368,140
Claims priority, application Great Britain, May 20, 1963,
19,955/63
1 Claim. (Cl. 60—13)

This invention relates to a method of supercharging and a supercharger for an internal combustion engine.

In internal combustion engines where the performance is improved by an exhaust-driven turbocharger the performance at low engine speeds, where the energy available to the turbine is low, is poor and it is necessary to modify the timing of the engine or to use a separately driven compressor to improve this performance and to permit the engine to run satisfactorily at low speeds. Further, with engines which are intended to run in either direction the modification of timing which is possible is limited since an improvement in running of the engine at low speed in one direction can only be obtained at the expense of the performance of the engine in the opposite direction.

According to the invention, the method of supercharging an internal combustion engine, comprises operatively connecting an exhaust-driven turbine to a compressor having at least two stages for supplying supercharged air for combustion to the engine and matching the power required for driving the compressor to the power available from the engine exhaust gases.

A supercharger, according to the invention, comprises a turbine intended to be driven by exhaust gases from the engine, at least two compressor impellers operatively connected to the turbine and intended each to supply supercharged air for combustion to the engine, and means for isolating at least one of impellers from the engine in such wise that the air supplied to the engine matches or substantially matches the air requirements of the engine at the appropriate speed.

The impellers may be mounted on a power output shaft of the turbine, which shaft may also be common to both impellers.

One embodiment of supercharger according to the invention is described by way of example only, with reference to the accompanying drawing which is an axial section of the supercharger.

Referring to the drawing, two co-axial centrifugal compressor impellers 10, 11 of such dimensions as jointly to supply an internal combustion engine (not illustrated) with the correct amount of supercharged air for combustion at the desired pressure are mounted on a common shaft 12 which is the power output shaft of a turbine 13 to be driven by the engine exhaust gases. Air is drawn into the impeller 10 through an inlet 14 and discharged through a volute 15 and a transition section 16 to the induction manifold 17 of the engine. The inlet 14 and the volute 15 may at all times be open to the air supply and to the induction manifold 17, respectively.

Air is drawn into the impeller 11 through another intake 18 in which is interposed an isolating valve 19 in the form of a butterfly valve. The compressed air is discharged to the induction manifold 17 through a volute 20 and a transition section 21 in which is interposed an isolating valve 22 in the form of a butterfly valve.

The valves 19, 22 are arranged to be operated automatically by a linkage (not illustrated) in such manner or phase as may be considered desirable with respect to the desired engine and compressor operating characteristic, or by a servo-system (not illustrated) commanded either by the compressor outlet pressure or the engine operating speed as may be considered desirable in any particular case.

As both the energy available in the engine exhaust gases and the air requirements of the engine increase approximately linearly with engine speed, operation of the valves 19, 22 to match the supercharged air supply to the engine requirement also matches the power necessary to drive the impellers 10, 11 with the energy available in the engine exhaust gases. Thus, the turbine 13 will reach the impeller design operating speed at lower engine speeds and the full supercharge pressure will be reached before the engine is running at full speed. Therefore, the response of the engine to opening of the throttle will also be improved.

I claim:

A supercharger for an internal combustion engine having an induction manifold comprising a turbine connected to be driven by exhaust gases from the engine, at least two compressor impellers operatively connected to the turbine and each connected to supply supercharged air for combustion to the engine, separate inlets connected for feeding air separately to each impeller, separate volutes and transition sections leading from said volutes connected for discharging compressed air separately from each impeller to the common induction manifold of the engine, and means for isolating at least one of the impellers from the engine such that the air supplied to the engine matches or substantially matches the air requirements of the engine at the appropriate speed, said means including a first air isolating valve interposed in the inlet to the one impeller for controlling the feed of air to the said one impeller, and a second isolating valve interposed in the transition section associated with the said one impeller for controlling the discharge of air from the said one impeller.

References Cited by the Examiner

UNITED STATES PATENTS

| 2,296,268 | 9/42 | Buchi | 60—13 |
| 2,321,943 | 6/43 | Sampietro | 60—13 X |
| 2,359,615 | 10/44 | Brown et al. | 60—13 |
| 2,375,006 | 5/45 | Larrecq | 60—13 |
| 2,542,539 | 2/51 | Kuhrt et al. | 60—13 |
| 2,773,348 | 12/56 | Grieshaber et al. | 60—13 |

MARK NEWMAN, *Primary Examiner.*

RICHARD B. WILKINSON, *Examiner.*